United States Patent
Kolman et al.

(12) 
(10) Patent No.: US 9,331,916 B1
(45) Date of Patent: May 3, 2016

(54) DATA-DRIVEN DETECTION OF SERVERS AND CLIENTS

(71) Applicant: EMC Corporation, Hopkinton, MA (US)

(72) Inventors: Eyal Kolman, Tel Aviv (IL); Alex Vaystikh, Hod Hasharon (IL); Oshry Ben-Harush, Qyiriat Gat (IL)

(73) Assignee: EMC Corporation, Hopkinton, MA (US)

(*) Notice: Subject to any disclaimer, the term of this patent is extended or adjusted under 35 U.S.C. 154(b) by 497 days.

(21) Appl. No.: 13/832,280

(22) Filed: Mar. 15, 2013

(51) Int. Cl.
*G06F 15/173* (2006.01)
*H04L 12/26* (2006.01)

(52) U.S. Cl.
CPC .................................... *H04L 43/04* (2013.01)

(58) Field of Classification Search
CPC ........................................................ H04L 43/04
USPC ........................................................ 709/224
See application file for complete search history.

(56) References Cited

U.S. PATENT DOCUMENTS

| | | | |
|---|---|---|---|
| 6,125,401 A | 9/2000 | Huras et al. | |
| 8,868,728 B2 | 10/2014 | Margolies et al. | |
| 8,874,550 B1 * | 10/2014 | Soubramanien | G06F 17/30572 707/708 |
| 2010/0146100 A1 * | 6/2010 | Gerber | H04L 47/2425 709/224 |

FOREIGN PATENT DOCUMENTS

WO         2014084849  A1     6/2014

* cited by examiner

*Primary Examiner* — Hee Soo Kim
(74) *Attorney, Agent, or Firm* — BainwoodHuang (57) ABSTRACT

An improved technique involves processing network traffic data to automatically establish whether a device on the network satisfies a particular set of constraints. Along these lines, a SIEM server observes and processes incoming and outgoing traffic data corresponding to a particular device at an address of the network. The SIEM server then analyzes this traffic data in order to determine whether the data satisfies a set of constraints satisfied by a client, or another set of constraints satisfied by a server. The SIEM server then applies the label of "client" or "server" to the device according to which set of constraints the SIEM server determines the data to have satisfied.

20 Claims, 4 Drawing Sheets

DATA-DRIVEN DETECTION OF SERVERS AND CLIENTS

BACKGROUND

A security incident and event management (SIEM) system consists of infrastructure that includes software and/or hardware configured to provide detection and alerting of incidents on a network. A system which operates in a manner similar to this is enVision™, a product of EMC Corp. of Hopkinton, Mass.

Some SIEM systems label devices on a network as being either a client or a server. A conventional approach to distinguishing between clients and servers in a SIEM system involves using a manually labeled list of servers and clients. Along these lines, an administrator compiles such a list from knowledge of the devices on the network.

SUMMARY

Unfortunately, there are deficiencies with the above-described conventional approaches to distinguishing between clients and servers in a SIEM system. For example, manually updated lists of clients and servers tend to be burdensome to an administrator, error-prone, and difficult to update. Along these lines, in a network containing many devices, it is easy for an administrator to mislabel a device. Further, it is also difficult to add to such a list every time new devices are added to the network.

In contrast to the conventional approaches to, an improved technique involves processing network traffic data to automatically establish whether a device on the network satisfies a particular set of constraints. Along these lines, a SIEM server observes and processes incoming and outgoing traffic data corresponding to a particular device at an address of the network. The SIEM server then analyzes this traffic data in order to determine whether the data satisfies a set of constraints satisfied by a client, or another set of constraints satisfied by a server. The SIEM server then applies the label of "client" or "server" to the device according to which set of constraints the SIEM server determines the data to have satisfied.

Advantageously, STEM systems that automate the process of establishing whether a device belongs to a particular category (e.g., clients or servers) reduce the burden on an administrator, have more success in predicting whether a device is acting as a device or a server, and quickly adapt to changing conditions in the network. For example, the SIEM server may use a fuzzy model to determine likelihoods that a given data set will be classified as a client or server. Such fuzzy models, besides being well-suited to automation, are better adapted to classify traffic data that is not clearly acting as a client or a server over a given period of time. These fuzzy models are then well equipped to address problems such a server creep on the network and thus allow an administrator to better focus limited resources on real devices of concern on the network.

One embodiment of the improved technique is directed to a method of monitoring a device at a particular address on a network in a Security Information and Event Management (SIEM) system. The method includes recording, by processing circuitry, data indicative of traffic flow to and from the particular address on the network over a period of time. The method also includes performing, by the processing circuitry, a categorization operation on the data to generate a categorization result indicative of whether the data satisfies one of a group of constraint sets, each constraint set of the group of constraint sets corresponding to a category of a set of categories, each category of the set of categories having a label associated with that category. The method further includes applying, by the processing circuitry, a label of a particular category to the device at the particular address when the categorization result indicates that the data satisfies the constraint set of the group of constraint sets that corresponds to the particular category, the application of a label of a category indicating that the device behaves as a member of that category.

Additionally, some embodiments of the improved technique are directed to an apparatus constructed and arranged to monitor a device at a particular address on a network in a SIEM system. The apparatus includes a network interface, memory, and a controller including controlling circuitry constructed and arranged to carry out the method of monitoring a device at a particular address on a network in a SIEM system.

Furthermore, some embodiments of the improved technique are directed to a computer program product having a non-transitory computer readable storage medium which stores code including a set of instructions which, when executed by a computer, cause the computer to carry out the method of monitoring a device at a particular address on a network in a SIEM system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves processing network traffic data to automatically establish whether a device on the network satisfies a particular set of constraints. Along these lines, a SIEM server observes and processes incoming and outgoing traffic data corresponding to a particular device at an address of the network. The SIEM server then analyzes this traffic data in order to determine whether the data satisfies a set of constraints satisfied by a client, or another set of constraints satisfied by a server. The STEM server then applies the label of "client" or "server" to the device according to which set of constraints the SIEM server determines the data to have satisfied.

Advantageously, STEM systems that automate the process of establishing whether a device belongs to a particular category (e.g., clients or servers) reduce the burden on an administrator, have more success in predicting whether a device is acting as a device or a server, and quickly adapt to changing conditions in the network. For example, the SIEM server may use a fuzzy model to determine likelihoods that a given data set will be classified as a client or server. Such fuzzy models, besides being well-suited to automation, are better adapted to classify traffic data that is not clearly acting as a client or a server over a given period of time. These fuzzy models are then well equipped to address problems such a server creep on the network and thus allow an administrator to better focus limited resources on real devices of concern on the network.

Figure 1:
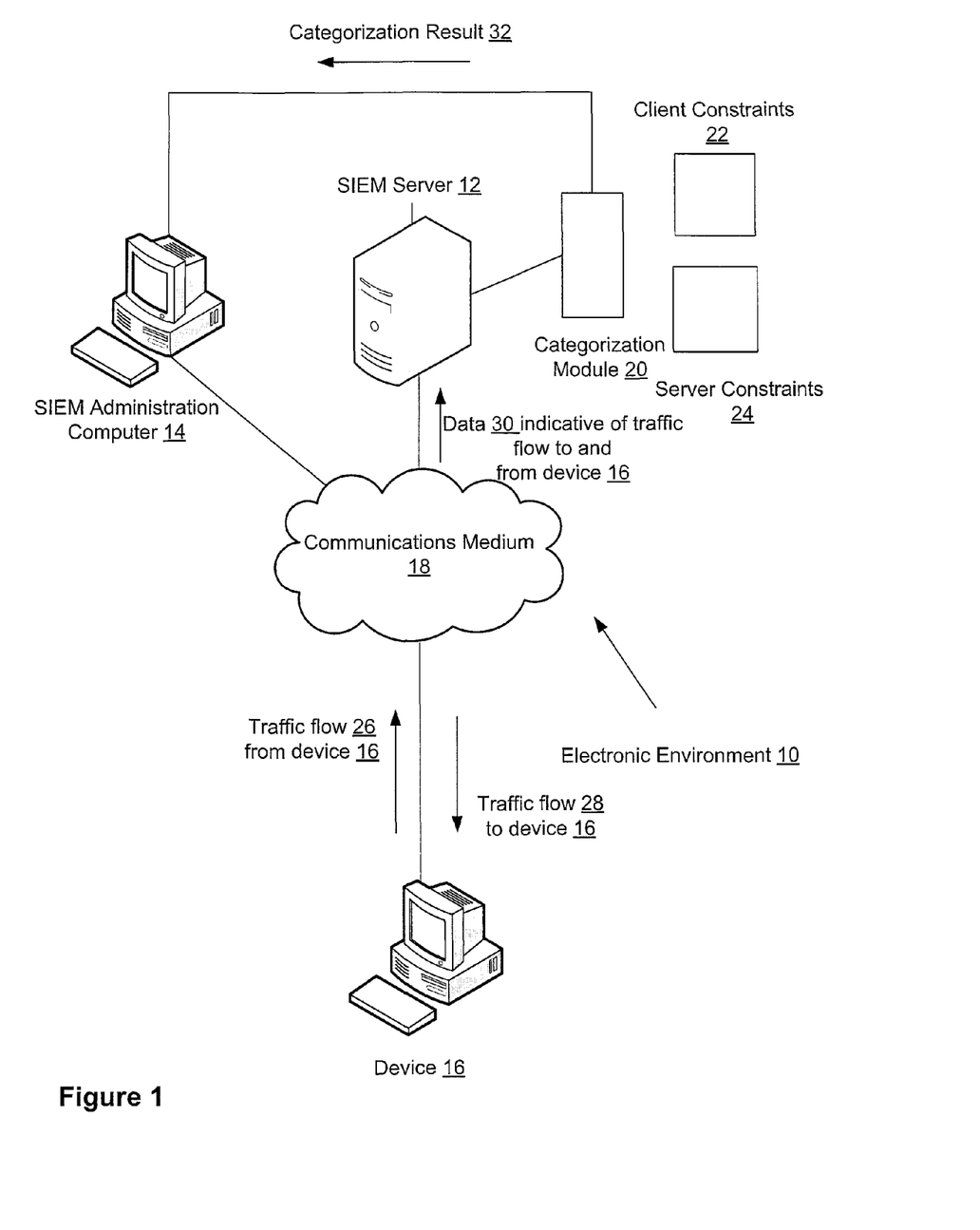
FIG. 1 is a block diagram illustrating an example electronic environment for carrying out the improved technique.

FIG. 1 illustrates an example electronic environment 10 for carrying out the improved technique. Electronic environment 10 includes SIEM server 12, SIEM administrator computer 14, device 16, and communications medium 18.

Communication medium 18 provides network connections between SIEM server 12 and device 16. Communications medium 18 may implement a variety of protocols such as TCP/IP, UDP, ATM, Ethernet, Fibre Channel, combinations thereof, and the like. Furthermore, communications medium 18 may include various components (e.g., cables, switches/routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

SIEM server 12 is constructed and arranged to monitor traffic to and from device 16 and generate traffic data as a result of the monitoring. SIEM server 12 is also constructed and arranged to process the data so as to determine whether the data satisfies one of a particular set of constraints. SIEM server 12 is a server; in some arrangements, however, SIEM server may take the form of a desktop computer, a laptop, or the like having a microprocessing unit. STEM server 12 includes a categorization module 20.

Categorization module 20 is constructed and arranged to assign a "client" or "server" label according to whether data 30 satisfies client constraints 22 or server constraints 24. Categorization module 20 will be discussed in more detail with respect to FIG. 2 and FIG. 3 below.

SIEM administrator computer 14 is constructed and arranged to provide an interface with which an administrator (not pictured) interacts with SIEM server 12. SIEM administrator computer 14 is a desktop PC; in some arrangements, however, SIEM administrator computer 14 may be a laptop, a table computer, a smartphone, and the like.

Device 16 is constructed and arranged to accept incoming data and produce outgoing data from a particular address on the network (not pictured). Device 16 is either a client or a server, although in some arrangements, client 16 may also take the form of a peer-to-peer device.

During operation, SIEM server 12 monitors traffic flowing to 26 and from 28 device 16 at an address of a network (not pictured). Traffic 26 flowing to device 16 typically includes, but is not limited to, login requests, messages into the network, ping requests, and the like. Traffic 28 flowing from device 16 typically includes, but is not limited to, DNS requests, messages to destinations outside the network, and the like. In monitoring traffic at that address, SIEM server 12 receives data 30 detailing traffic 26 and 28 from that address and stores it in a database (not pictured).

Over a given period of time, say a day, SIEM server 12 extracts data 30 from the database and examines the data from the viewpoint of certain parameters. For example, SIEM server 12 analyzes, from data 30, a number of initiated communications, net traffic volume, traffic duration, activity times, and number of distinct connections per port. In some arrangements, SIEM server 12 also analyzes static features such as whether device 16 is listed in the DNA registration, what operating system device 16 runs, and the like.

It should be understood that the above parameters were chosen because their behavior is expected to be different for clients and servers. For example, a server would be expected to have a smaller number of initiated communications because servers exist to receive requests, not generate them. Servers, however, are expected to experience a higher traffic volume than a client. Servers are also more likely to have a longer duration of activity than a client, and more distinct connections per port than a client.

SIEM server 12 compares values of these parameters extracted from data 30 and of additional functions that use these values with constraints on these values and functions as defined by client constraints 22 and server constraints 24. When parameter values extracted from data 30 more closely resemble parameter values defined by client constraints 22, then categorization module 20 assigns the "client" label to device 16. On the other hand when parameter values extracted from data 30 more closely resemble parameter values defined by server constraints 24, then categorization module 20 assigns the "server" label to device 16. Categorization module 20 assigns such a label to a categorization result 32 which categorization module 20 sends to SIEM administration computer 14 for the administrator's record keeping.

It should be understood that SIEM server 20 continues to monitor device 16 at the address on the network after this categorization operation has been completed. For example, suppose that device 16 receives a "client" label as categorization result 32. Further suppose that, sometime later, device 16 generates data 30 that more closely matches server constraints 24 than client constraints 22, implying that device 16 is acting more like a server than a client. In such a case, for example, there is a server creep situation and network resources may be used inappropriately. In this case, SIEM server 12 may issue an alert to SIEM administration computer 14, which may then initiate an on-site investigation.

Further details of SIEM server 12 are discussed below with respect to FIG. 2.

Figure 2:
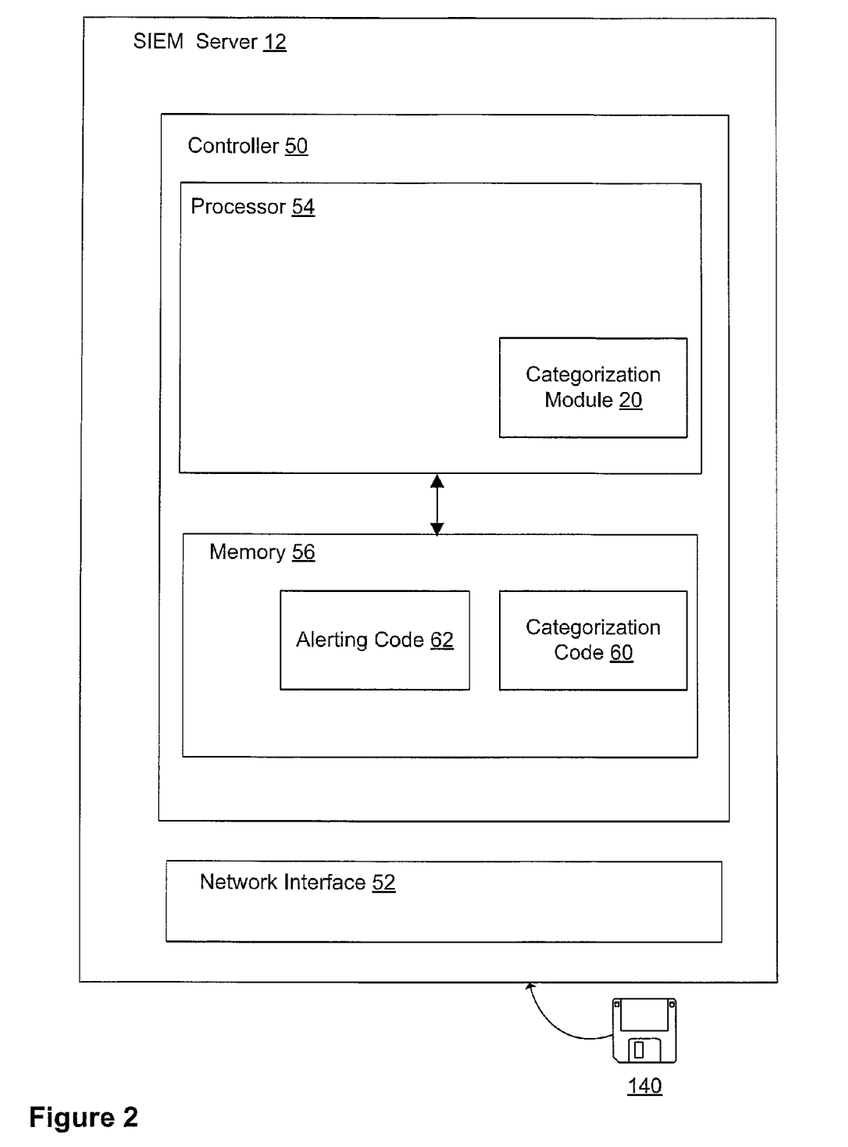
FIG. 2 is a block diagram illustrating an example SIEM server within the electronic environment shown in FIG. 1.

FIG. 2 illustrates details of an example SIEM server 12. SIEM server 12 includes controller 50, which in turn includes processor 54 and memory 56, and network interface 52.

Network interface 52 takes the form of an Ethernet card; in some arrangements, network interface 52 may take other forms including a wireless receiver or a token ring card.

Memory 56 is configured to store code 48 that contains instructions configured to cause the processor to carry out the improved technique. Memory 56 generally takes the form of, e.g., random access memory, flash memory or a non-volatile memory or a combination thereof. Memory 56 includes Categorization code 60, which is configured to cause categorization module 20 to produce categorization result 32 (see FIG. 1), and Alerting Code 62 which is configured to produce an alert upon a change in category of device 16 (see FIG. 1).

Processor 54 takes the form of, but is not limited to, Intel or AMD-based MPUs, and can include a single-core or multi-cores each running single or multiple threads. In some arrangements, processor 54 is one of several processors working together. Processor 54 includes categorization module 20, which is described in further detail below with respect to FIG. 3.

Figure 3:
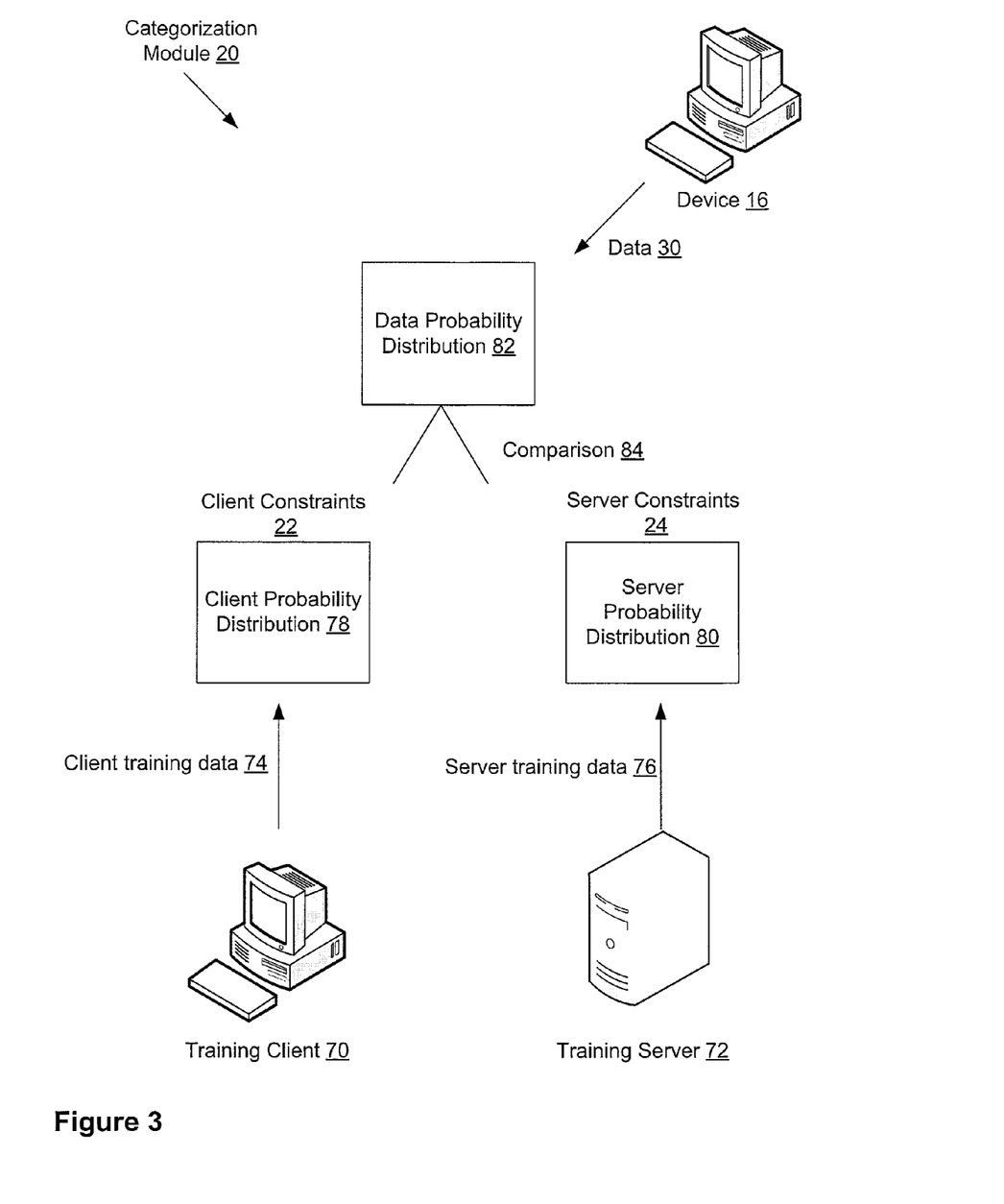
FIG. 3 is a block diagram illustrating an example classification operation within the electronic system shown in FIG. 1.

FIG. 3 illustrates an example categorization module 20 within processor 54. In this case, categorization module 20 assumes a probabilistic model for the client and server categories. That is, each of the traffic parameters whose values are extracted by SIEM server 20 (see FIG. 1) are represented by a random variable having some probability distribution function (PDF). For simplicity in this discussion, the random variables are normally distributed but are neither identical nor independent. That is, the random variables have nonzero covariances and distinct variances and means. It should be understood, however, that these random variables can have other PDFs; in fact, different random variables may even have different PDFs altogether.

A first step in the process of categorization, or classification, lies in training categorization module 20 to identify clients and servers. Essentially, this means constructing client constraints 22 and server constraints 24 in the form of individual PDFs. That is, categorization module 20 receives client training data 74 from training client 70. Categorization module 20 assumes client training data 74 has the following probability distribution 78:

$$f_{client}(x) = \frac{1}{(2\pi)^{\frac{k}{2}}|\Sigma_1|}\exp\left[-\frac{1}{2}(x-\mu_1)^T\Sigma_1^{-1}(x-\mu_1)\right], \quad (*)$$

where x is a vector of parameters, values of which categorization module 20 extracts from client training data 74, $\mu_1$ is an array of expected values of the random variables representing the parameters of training data 74, $\Sigma_1$ is the covariance matrix corresponding to those random variables and k is the number of random variables, or parameters, under consideration.

As an illustration, consider two traffic parameters: ratio of initiated communication to total communications X and traffic volume Y. Possible values of X are all values between 0 and 1, while possible values of Y may be between 0 and ∞. In this case, categorization module 20 computes the expected value $E(X)=\mu_x$ and the expected value $E(Y)=\mu_y$ from the data. Categorization module also computes the variances $E(X^2)=\sigma_x^2$ and $E(Y^2)=\sigma_y^2$ as well as the covariance $E(XY)=\sigma_x\sigma_y$, which values comprise the covariance matrix $\Sigma_1$.

It should be understood that categorization module 20 uses an expectation-maximization (EM) procedure to compute the expected value array and covariance matrix. That is, categorization module 20 assumes a PDF of the form (*) and performs an iterative operation to find best estimates for these quantities. As it is assumed that one of ordinary skill in the art is familiar with such an operation, there will be no further discussion of EM.

Categorization module 20 also assumes server training data 76 has the following PDF 80:

$$f_{server}(x) = \frac{1}{(2\pi)^{\frac{k}{2}}|\Sigma_2|}\exp\left[-\frac{1}{2}(x-\mu_2)^T\Sigma_2^{-1}(x-\mu_2)\right]. \quad (**)$$

Categorization module 20 applies the same EM procedure to the PDF in (**) to find its array of expected values and covariance matrix.

Once this training phase has been completed, categorization module 20 is ready to accept actual data 30 from device 16 which may be either a client or a server. In this case, categorization module 20 assumes that data 30 follows the following combined PDF 82:

$$f_{combined}(x) = \frac{c_1}{(2\pi)^{\frac{k}{2}}|\Sigma_1|}\exp\left[-\frac{1}{2}(x-\mu_1)^T\Sigma_1^{-1}(x-\mu_1)\right] +$$
$$\frac{c_2}{(2\pi)^{\frac{k}{2}}|\Sigma_2|}\exp\left[-\frac{1}{2}(x-\mu_2)^T\Sigma_2^{-1}(x-\mu_2)\right]$$

where $c_1$ and $c_2$ represent prior probabilities of client and server, respectively. Categorization module 20 estimates these quantities, as well as the expected values and covariance matrices, by an EM procedure and determines $f_{combined}(x)$. (It should be noted that, although the notation is the same, the expected values and covariance matrices are not taken to be those determined in (*) and (**).)

Given this PDF for data 30, categorization module 20 then determines a confidence level that device 16 is a client or a server. Categorization module 20 achieves this via a maximum a posteriori (MAP) estimation approach which is familiar to those skilled in the art. The result of this MAP estimation is a classification of device 16 as a client or a server.

Figure 4:
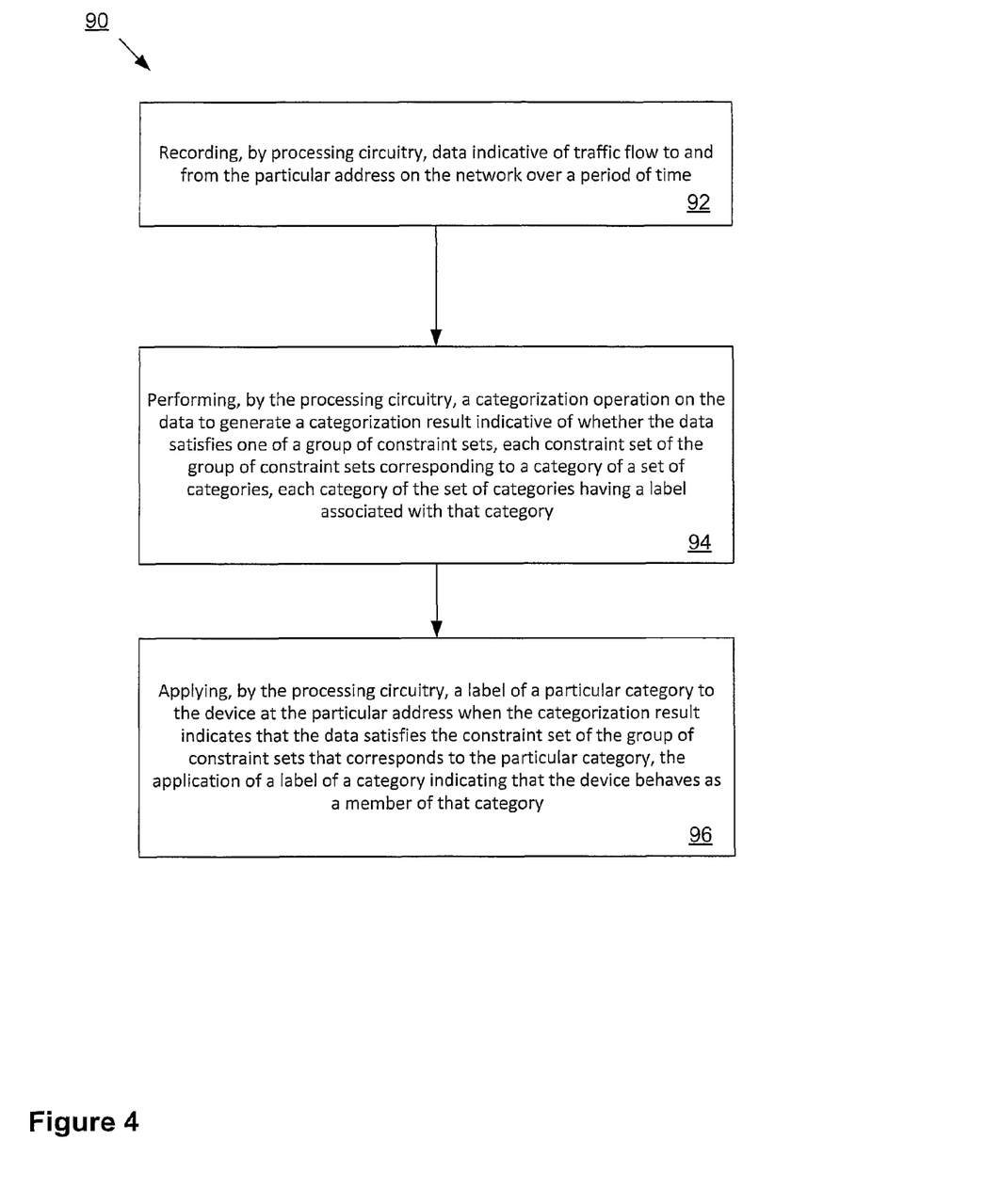
FIG. 4 is a flow chart illustrating an example method of carrying out the improved technique within the electronic environment shown in FIG. 1.

A summary of the general categorization method summarized above is described in detail with respect to FIG. 4.

FIG. 4 illustrates a method 90 monitoring a device at a particular address on a network in a STEM system, including steps 92, 94, and 96. In step 92, data indicative of traffic flow to and from the particular address on the network over a period of time is recorded. In step 94, a categorization operation is performed on the data to generate a categorization result indicative of whether the data satisfies one of a group of constraint sets, each constraint set of the group of constraint sets corresponding to a category of a set of categories, each category of the set of categories having a label associated with that category. In step 96, a label of a particular category is applied to the device at the particular address when the categorization result indicates that the data satisfies the constraint set of the group of constraint sets that corresponds to the particular category, the application of a label of a category indicating that the device behaves as a member of that category.

While various embodiments of the invention have been particularly shown and described, it will be understood by those skilled in the art that various changes in form and details may be made therein without departing from the spirit and scope of the invention as defined by the appended claims.

For example, while the categories discussed above included clients and servers, in some arrangements, it is possible to have additional categories. For example, one such category is a peer-to-peer category in which roughly equal amounts of incoming and outgoing traffic may be expected.

Furthermore, it should be understood that some embodiments are directed to SIEM server 12, which is constructed and arranged to monitor a device at a particular address on a network. Some embodiments are directed to a process of monitoring a device at a particular address on a network. Also, some embodiments are directed to a computer program product which enables computer logic to monitor a device at a particular address on a network.

In some arrangements, SIEM server 12 is implemented by a set of processors or other types of control/processing circuitry running software. In such arrangements, the software instructions can be delivered, within SIEM server 12, either in the form of a computer program product 140 (see FIG. 2) or simply instructions on disk or in pre-loaded in memory 56 of SIEM server 12, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. In a Security Information and Event Management (SIEM) system, a method of monitoring a device at a particular address on a network, the method comprising:
   recording, by processing circuitry, data indicative of traffic flow to and from the particular address on the network over a period of time;
   performing, by the processing circuitry, a categorization operation on the data to generate a categorization result indicative of whether the data satisfies one of a group of constraint sets, each constraint set of the group of constraint sets corresponding to a category of a set of categories, each category of the set of categories having a label associated with that category; and applying, by the processing circuitry, a label of a particular category to the device at the particular address when the categorization result indicates that the data satisfies the constraint set of the group of constraint sets that corresponds to the particular category, the application of a label of a category indicating that the device behaves as a member of that category, wherein the set of categories includes a server category and a client category, wherein performing the categorization operation includes:
comparing, by the processing circuitry, the traffic flow to the particular address and the traffic flow from the particular address, and wherein applying the label of the particular category to the device at the particular address includes:
applying a client label to the device when a mean traffic flow from the particular address exceeds a mean traffic flow to the particular address; and
applying a server label to the device when the mean traffic flow to the particular address exceeds the mean traffic flow from the particular address.

2. A method as in claim 1, further comprising:
recording further data indicative of traffic flow to and from the particular address on the network over another period of time after the period of time;
performing another categorization operation on the further data to generate another categorization result indicative of whether the further data satisfies the constraint set of the group of constraint sets that corresponds to the particular category; and
generating an alert when the other categorization result indicates that the further data does not satisfy the constraint set of the group of constraint sets that corresponds to the particular category.

3. A method as in claim 1,
wherein the data indicative of the traffic flow includes values of traffic parameters, the traffic parameters each being represented by a random variable having a domain of possible values and a probability distribution;
wherein recording the data indicative of the traffic flow to and from the particular address on the network over the period of time includes:
forming a client probability distribution indicative of a probability that the device having parameters values within a region of the domain of possible values behaves as a client, the client probability distribution having client probability distribution parameters,
forming a server probability distribution indicative of a probability that the device having parameters values within a region of the domain of possible values behaves as a server, the server probability distribution having server probability distribution parameters, and
producing a combined probability distribution from a weighted sum of the client probability distribution and the server probability distribution, the combined probability distribution serving to represent a probability distribution of the data.

4. A method as in claim 3,
wherein the client probability distribution is a normal distribution and the client probability distribution parameters includes a client mean array having elements that are expected values of traffic parameters and a client covariance matrix having elements that are covariances of pairs of traffic parameters;
wherein the server probability distribution is another normal distribution and the server probability distribution parameters includes a server mean array having elements that are other expected values of traffic parameters and a server covariance matrix having elements that are other covariances of pairs of traffic parameters;
wherein producing the combined probability distribution includes:
generating a client prior probability that the device is a client,
generating a server prior probability that the device is a server, and
weighting the client probability distribution with the client prior probability and the server probability distribution with the server prior probability.

5. A method as in claim 4,
wherein the random variables representing the traffic parameters are independent;
wherein producing the combined probability distribution further includes:
performing an expectation-maximization operation that serves to maximize a logarithm of a likelihood that the device is a client or a server, the expectation maximization operation generating the client prior probability, the server prior probability, the client mean array, server mean array, the client covariance matrix, and the server covariance matrix.

6. A method as in claim 4,
wherein comparing the traffic flow to the particular address and the traffic flow from the particular address includes:
verifying whether the probability distributions of the random variables representing the traffic parameters more closely matches those for the client probability distribution or the server probability distribution.

7. A method as in claim 6, further comprising:
prior to recording the data, performing a training operation on a set of training data, the training data originating from a device known to be one of either a client and a server, the training operation serving to establish a client threshold likelihood that the device is a client and a server threshold likelihood that the device is a server.

8. A method as in claim 7,
wherein verifying whether the probability distributions of the random variables representing the traffic parameters more closely matches those for the client probability distribution or the server probability distribution includes:
performing a maximum a posteriori estimation operation on the training data that serves to produce a confidence level that the combined probability distribution is closer to one of the client probability distribution and the server probability distribution.

9. A method as in claim 1,
wherein the set of categories further includes a peer-to-peer category; and
wherein applying the label of the particular category to the device at the particular address includes:
applying a peer-to-peer label to the device when a difference between the mean traffic flow from the particular address and the mean traffic flow to the particular address is less than a difference threshold.

10. In a Security Information and Event Management (SIEM) system, an apparatus constructed and arranged to monitor a device at a particular address on a network, the apparatus comprising:

a network interface;
memory; and
a controller including controlling circuitry, the controlling circuitry being constructed and arranged to:
  record data indicative of traffic flow to and from the particular address on the network over a period of time;
  perform a categorization operation on the data to generate a categorization result indicative of whether the data satisfies one of a group of constraint sets, each constraint set of the group of constraint sets corresponding to a category of a set of categories, each category of the set of categories having a label associated with that category; and
  apply a label of a particular category to the device at the particular address when the categorization result indicates that the data satisfies the constraint set of the group of constraint sets that corresponds to the particular category, the application of a label of a category indicating that the device behaves as a member of that category,
wherein the set of categories includes a server category and a client category,
wherein the controlling circuitry constructed and arranged to perform the categorization operation is further constructed and arranged to:
  compare the traffic flow to the particular address and the traffic flow from the particular address, and
wherein the controlling circuitry constructed and arranged to apply the label of the particular category to the device at the particular address is further constructed and arranged to:
  apply a client label to the device when a mean traffic flow from the particular address exceeds a mean traffic flow to the particular address; and
  apply a server label to the device when the mean traffic flow to the particular address exceeds the mean traffic flow from the particular address.

11. An apparatus as in claim 10, wherein the controlling circuitry is further constructed and arranged to:
  record further data indicative of traffic flow to and from the particular address on the network over another period of time after the period of time;
  perform another categorization operation on the further data to generate another categorization result indicative of whether the further data satisfies the constraint set of the group of constraint sets that corresponds to the particular category; and
  generate an alert when the other categorization result indicates that the further data does not satisfy the constraint set of the group of constraint sets that corresponds to the particular category.

12. An apparatus as in claim 10,
wherein the data indicative of the traffic flow includes values of traffic parameters, the traffic parameters each being represented by a random variable having a domain of possible values and a probability distribution;
wherein the controlling circuitry constructed and arranged to record the data indicative of the traffic flow to and from the particular address on the network over the period of time is further constructed and arranged to:
  form a client probability distribution indicative of a probability that the device having parameters values within a region of the domain of possible values behaves as a client, the client probability distribution having client probability distribution parameters,
  form a server probability distribution indicative of a probability that the device having parameters values within a region of the domain of possible values behaves as a server, the server probability distribution having server probability distribution parameters, and
  produce a combined probability distribution from a weighted sum of the client probability distribution and the server probability distribution, the combined probability distribution serving to represent a probability distribution of the data.

13. An apparatus as in claim 12,
wherein the client probability distribution is a normal distribution and the client probability distribution parameters includes a client mean array having elements that are expected values of traffic parameters and a client covariance matrix having elements that are covariances of pairs of traffic parameters;
wherein the server probability distribution is another normal distribution and the server probability distribution parameters includes a server mean array having elements that are other expected values of traffic parameters and a server covariance matrix having elements that are other covariances of pairs of traffic parameters;
wherein the controlling circuitry constructed and arranged to produce the combined probability distribution is further constructed and arranged to:
  generate a client prior probability that the device is a client,
  generate a server prior probability that the device is a server, and
  weight the client probability distribution with the client prior probability and the server probability distribution with the server prior probability.

14. An apparatus as in claim 13,
wherein the random variables representing the traffic parameters are independent;
wherein the controlling circuitry constructed and arranged to produce the combined probability distribution is further constructed and arranged to:
  perform an expectation-maximization operation that serves to maximize a logarithm of a likelihood that the device is a client or a server, the expectation maximization operation generating the client prior probability, the server prior probability, the client mean array, server mean array, the client covariance matrix, and the server covariance matrix.

15. An apparatus as in claim 13,
wherein the controlling circuitry constructed and arranged to compare the traffic flow to the particular address and the traffic flow from the particular address is further constructed and arranged to:
  verify whether the probability distributions of the random variables representing the traffic parameters more closely matches those for the client probability distribution or the server probability distribution.

16. An apparatus as in claim 15, wherein the controlling circuitry is further constructed and arranged to:
  prior to recording the data, perform a training operation on a set of training data, the training data originating from a device known to be one of either a client and a server, the training operation serving to establish a client threshold likelihood that the device is a client and a server threshold likelihood that the device is a server.

17. An apparatus as in claim 16,
wherein the controlling circuitry constructed and arranged to verify whether the probability distributions of the random variables representing the traffic parameters more closely matches those for the client probability distribution or the server probability distribution is further constructed and arranged to:
perform a maximum a posteriori estimation operation on the training data that serves to produce a confidence level that the combined probability distribution is closer to one of the client probability distribution and the server probability distribution.

18. A computer program product having a non-transitory, computer-readable storage medium which stores code for monitoring a device at a particular address on a network, the code including instructions which, when executed by a computer, causes the computer to:
record data indicative of traffic flow to and from the particular address on the network over a period of time;
perform a categorization operation on the data to generate a categorization result indicative of whether the data satisfies one of a group of constraint sets, each constraint set of the group of constraint sets corresponding to a category of a set of categories, each category of the set of categories having a label associated with that category; and
apply a label of a particular category to the device at the particular address when the categorization result indicates that the data satisfies the constraint set of the group of constraint sets that corresponds to the particular category, the application of a label of a category indicating that the device behaves as a member of that category,
wherein the set of categories includes a server category and a client category,
wherein the instructions that cause the computer to perform the categorization operation further cause the computer to:
compare the traffic flow to the particular address and the traffic flow from the particular address, and
wherein the instructions that cause the computer to apply the label of the particular category to the device at the particular address further cause the computer to:
apply a client label to the device when a mean traffic flow from the particular address exceeds a mean traffic flow to the particular address; and
apply a server label to the device when the mean traffic flow to the particular address exceeds the mean traffic flow from the particular address.

19. A method as in claim 1, wherein applying the label of the particular category to the device includes:
recording an identifier of a label of a first category in a storage device that is accessible by an administration device, and
wherein the method further comprises:
after recording the identifier in the storage device, receiving new data indicative of traffic flow to and from the particular address on the network over another period of time;
performing the categorization operation on the new data to generate another categorization result indicating that the data satisfies a constraint set corresponding to a second category distinct from the first category; and
transmitting an alert to the administration device indicating that the device behaves as a member of the second category, the alert providing improved security to the network by initiating an investigation into the behavior of the device.

20. A method as in claim 1, wherein recording the data indicative of the traffic flow to and from the particular address on the network includes receiving information about network traffic flowing to the device and network traffic flowing from the device.

* * * * *